United States Patent [19]
Riffe

[11] Patent Number: 5,341,920
[45] Date of Patent: Aug. 30, 1994

[54] LOAD SENSITIVE CONVEYOR TRAINING APPARATUS

[75] Inventor: Shirley D. Riffe, Crab Orchard, W. Va.

[73] Assignee: Long-Airdox Company, Oak Hill, W. Va.

[21] Appl. No.: 60,893

[22] Filed: May 12, 1993

[51] Int. Cl.⁵ ........................................... B65G 15/08
[52] U.S. Cl. .................... 198/825; 198/830; 198/831; 198/839; 198/840; 198/861.1
[58] Field of Search .............. 198/808, 824, 825, 830, 198/831, 839, 840, 861.1, 861.2, 861.3, 861.5

[56] References Cited

U.S. PATENT DOCUMENTS

| | | | |
|---|---|---|---|
| 977,987 | 12/1910 | Willson, Jr. .................... | 198/840 X |
| 2,818,962 | 1/1958 | Hörth ............................ | 198/839 X |
| 3,856,133 | 12/1974 | Dyachkov ..................... | 198/831 |
| 4,732,267 | 3/1988 | Schober ........................ | 198/839 X |
| 4,917,232 | 4/1990 | Densmore ..................... | 198/831 X |

FOREIGN PATENT DOCUMENTS

| | | | |
|---|---|---|---|
| 0174020 | 8/1986 | Japan ............................ | 198/825 |
| 0797980 | 1/1981 | U.S.S.R. ...................... | 198/825 |
| 1169903 | 7/1985 | U.S.S.R. ...................... | 198/830 |
| 2186857 | 8/1987 | United Kingdom ........... | 198/831 |

Primary Examiner—Cheryl L. Gastineau
Attorney, Agent, or Firm—Richard A. Speer

[57] ABSTRACT

An improved belt supporting and guiding apparatus enabling belt travel in other than a linear path wherein there is a base frame and a second frame mounted on the base frame; the second frame has center, left and right portions with surfaces which together define a belt support surface delimiting a concavity that is shaped other than as a constant arc of a circle so that rotation of the second frame on mounting rollers is about an instant center whose spatial location changes constantly.

12 Claims, 3 Drawing Sheets

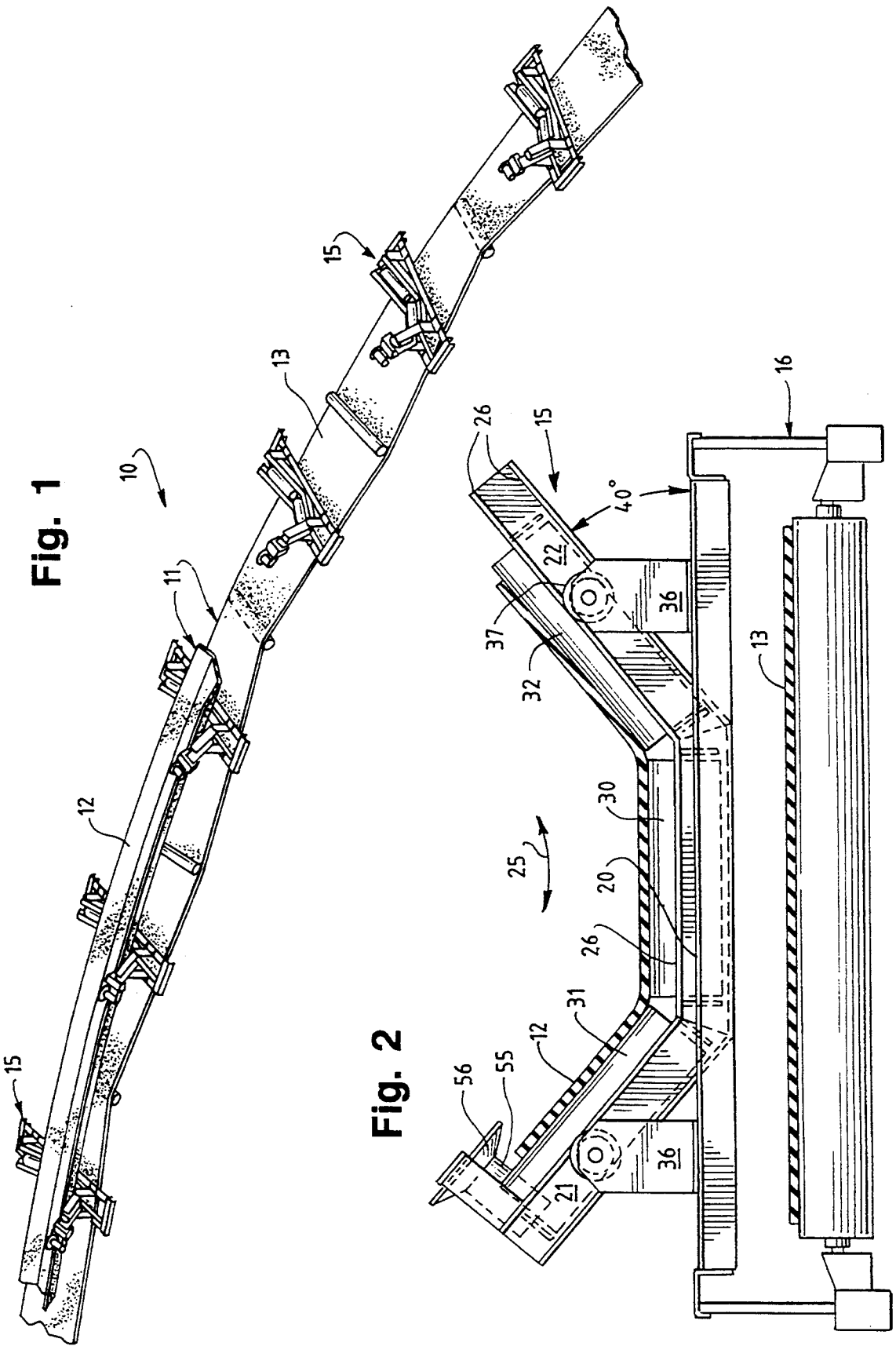

LOAD SENSITIVE CONVEYOR TRAINING APPARATUS

BACKGROUND

Conveyor systems which utilize endless belts for the transport or movement of materials from one location to another are used widely in industry. The belts may either be flat, in cross section, or may be concave or dish-shaped in section to more effectively transport particulate, that is, loose, bulk material. Flexible, endless belts are normally supported and directed by idler rollers, both in the delivery and return runs. And, of course, the belt and rollers are carried on suitable base support structure.

Since belt conveyor systems are frequently of great length, it occurs that changes in direction must be provided for. Thus, the situation arises where the belt is required to travel in other than a linear path while moving material in a horizontal plane. In conveyor systems for transporting bulk materials, the carrying structure is normally provided with idler rollers that form a trough-like area or concavity which receives an endless belt which is upwardly concave in cross section. In those situations where the conveyor belt must traverse curves in the horizontal plane, the tension in the longitudinal direction of the conveyor belt is uneven across the width of the belt. In order to cause the belt to follow a curved path, the rollers that support the weight of the belt and the material on the belt must also exert a lateral thrust against the belt in a direction away from the center of the curve of the belt path. The amount of this lateral thrust changes as the belt tension changes and as the weight of the material on the belt changes.

In the past, it has been proposed to compensate for the changes in lateral thrust by suspending the endless belt from a hanger arrangement so that the belt is in effect acting as a pendulum and is free to swing to and fro depending upon the lateral forces generated by the belt and the load carried on the belt. An arrangement such as this may be acceptable where space is available to permit free lateral movement of the belt about a fixed pivot or fulcrum point.

In contradistinction to those situations where space is not at a premium, there are many uses where endless conveyors are involved where space is quite limited. For example, in mining operations and in the removal of rock and other byproducts resulting from underground excavation such as in the digging of tunnels or other subterranean passageways, space is usually critical. In the case of tunnel excavation, for example, space is indeed at a premium because the hole being excavated is of limited size and not only must the excavated material be removed but other equipment such as drill heads, rail cars, etc. must also be accommodated within the same limited space. Problems are therefore encountered with regard to the space available for the installation of a conveyor system by means of which removal of bulk material can be accomplished.

It is a principal object of this invention to provide an improved belt supporting a guiding apparatus for use in utilizing an endless belt which travels in other than a straight line in the horizontal plane.

Another object of this invention is to provide a belt supporting apparatus in which an endless belt can convey material along a curved path.

An additional object of this invention is to provide a belt supporting apparatus in which an endless belt is supported by structure that enables the belt to self-adjust its spatial orientation when travelling in other than a straight line in the horizontal plane.

A further object of this invention is to provide a belt supporting apparatus in which support means are provided which enables an endless, load carrying belt to tilt from the horizontal plane when travelling in other than a straight line.

Yet another object of this invention is to provide support structure for an endless conveyor belt in which the belt is cradled in a concavity defined by a rotatably mounted frame.

Another important object of this invention is to provide rotatable support structure for an endless belt in a conveyor system in which the belt support structure requires minimal space for rotation.

A still further object of this invention is to provide a conveyor system having an endless belt support structure that rotates about an axis defining an instant center, the location of which center changes in space with each increment of rotation of the support structure.

Other objects and advantages of this invention will be in part obvious and in part explained by reference to the accompanying specification and drawings, in which:

FIG. 1 is a perspective of a portion of a conveyor system utilizing the belt support apparatus of this invention, illustrating the manner in which the support apparatus guides an endless belt along a curved path;

FIG. 2 is an elevation, partly sectioned, through the conveyor to show the belt support apparatus of the invention in a horizontal position;

DESCRIPTION OF INVENTION

Figure 3:
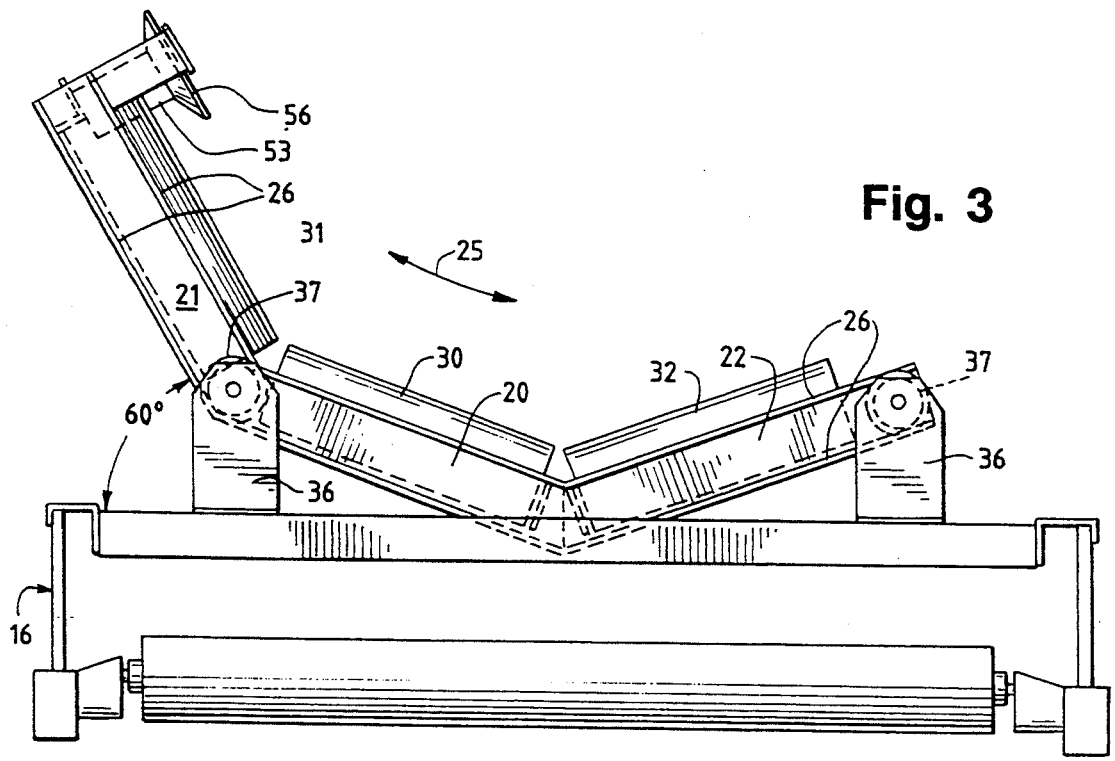
FIG. 3 is a view like FIG. 2, without the conveyor belt, showing the support apparatus in a rotated position.

In the present invention, a mounting apparatus has been developed for a continuous belt conveyor system which is mountable on the usual base frame and in which rotation of the belt supporting apparatus is constructed in a way that the belt and its immediate supporting mechanism never extend beyond the lateral limits of the usual base supporting structure. Thus by means of the present belt supporting apparatus it is possible to provide for movement of the belt in a curved path while still keeping the space within which the belt is tilted to an absolute minimum.

For a better understanding of the present invention, reference is made to the drawings and more specifically to FIG. 1 of the drawings in which the numeral 10 indicates generally a conveyor system utilizing an endless belt 11 that has an upper concave shaped delivery run 12 and a return run 13. FIG. 1 also shows the improved belt guiding and supporting apparatus 15 which is used to support the upper run 12 of belt 10. This apparatus is mounted on a base structure 16 which is not shown in FIG. 1 but can be seen in FIG. 2 of the drawings, for example.

Figure 4:
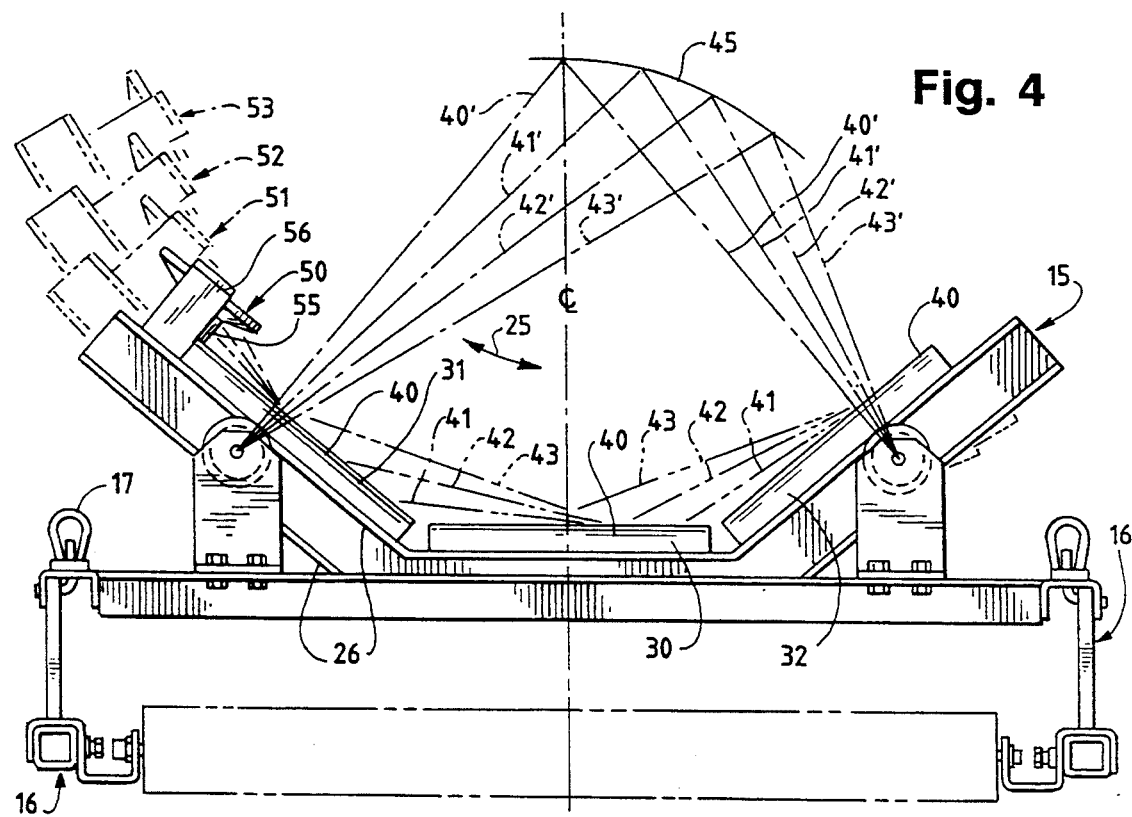
FIG. 4 is a view similar to FIG. 2, without the conveyor belt, illustrating the path of travel of the instant center of rotation as a function of rotation of belt support apparatus.

The second frame 15 is mountable on the base frame 16 and held in position by any suitable locking means 17, such as shown in FIG. 4 of the drawings. Referring to FIG. 2 of the drawings, it can be seen that the second frame, 15, is made up of a center portion 20 and left and right side portions 21 and 22, respectively. The left and right side portions 21 and 22 extend upwardly and outwardly from center portion 20, center portion 20 being shown in a horizontal position in FIG. 2, so as together they define a concavity 25 into which the upper run 12 of belt 11 is received. The second frame center and side portions can advantageously be constructed of material such as channel iron which has two outwardly extending webs, 26. The webs, of course, extend in a direction which is substantially normal to the transverse dimension of the side portions and between them define a generally U-shaped recessed area which is used to rotatably join secure frame 15 to base 16. The center portion 20 and the two side portions 21, 22 are joined together so that the side portions extend upwardly at an angle of about 40 degrees with respect to the horizontal plane of center portion 20. The particular angle chosen is not critical but is used in the present aperture as an angle which will limit the transverse reach of the second frame apparatus 15 when it is rotated from the position shown in FIG. 2 to that shown in FIG. 3, for example.

Figure 5:
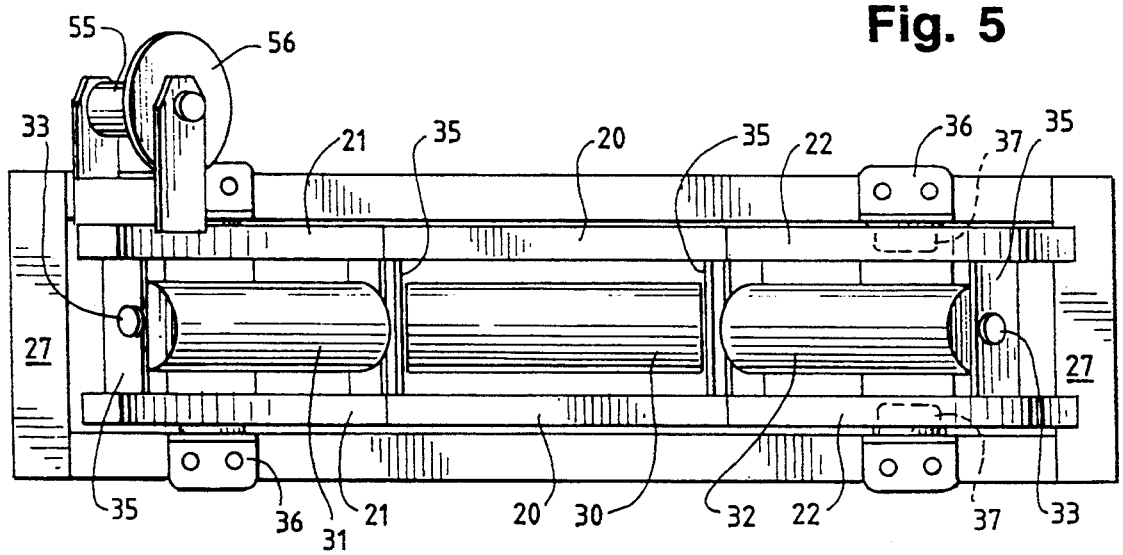
FIG. 5 is a top elevation showing the belt support apparatus of this invention.
Figure 6:
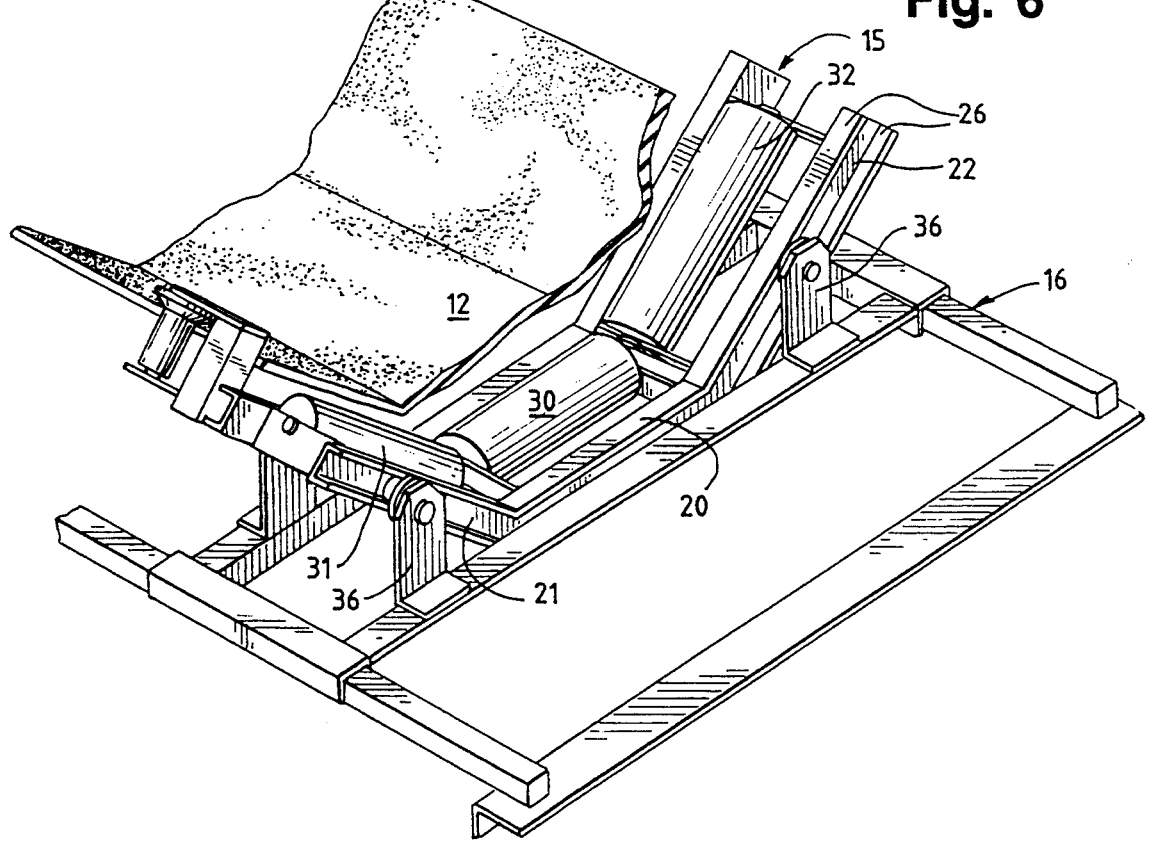
FIG. 6 is a perspective view of the support apparatus of this invention, including a portion of an endless conveyor belt.

Each second frame supporting apparatus 15 is, in the embodiment shown, constructed of pairs of lower portions 20 and left and right side portions 21, 22, as shown clearly in FIG. 5, and these pairs of structural elements 20, 21 and 22 are fixedly joined together by means of structural pieces 27 which extend between them.

Mounted within or carried by the second frames are idler rollers 30, 31 and 32 upon which the upper run 12 of the belt 11 is supported. Each of the rollers 30–32 has a journal that mounts in a fitting 35 which extends between cooperating pairs of the center and left and right side portions 20, 21 and 22, as shown in FIG. 5.

The means for rotatably mounting second frame 15 on the base structure 16 includes tabs 36 which are secured to the base frame 16 and extend outwardly therefrom. At a location spaced from the base frames, there are provided on tabs rotatable elements 37 which have greater diameter than width. Elements or wheels 37 are confined between the webs 26 of left and right hand portions 21 and 22 respectively. The wheels are positioned at locations in contact with a web of the left and right hand portions that permits a 20 degree angle of rotation of the second frame 15 from horizontal in either direction. Thus upon rotation of the support apparatus from the horizontal position of FIG. 2 to the tilted position of FIG. 3, the left hand side portion 21 is now canted upwardly at an angle of 60 degrees, with respect to horizontal. It is this rotation of the second frame 15 and the idler rollers 30–32 that enables the endless belt 12 to accommodate changes in direction from linear travel only, to travel along a curved path.

As the belt is forced to run in other than a straight linear path, the variation in longitudinally directed belt tension causes second frame 15 to rotate about an instant center whose spatial location changes constantly during rotation of the second frame. The nature of the rotation of second frame 15 and the path of travel of the instant center are best seen by reference to FIG. 4 of the drawings.

Referring to FIG. 4, the solid line identified as numeral 40 indicates the surfaces of each upper edge of each of the idler rolls 30, 31, 32 and the numerals 41, 42 and 43 represent examples of rotated positions which the surfaces of the rolls could assume upon rotation of the second frame. In this Figure, the numerals 40', 41', 42' and 43' denote lines which extend from the center of the axis of rotation of the rotatable elements 37 and parallel to the lateral dimension of portions 20–22. That is, lines 40', 41', 42' and 43' are normal to the tangent passing through the point of contact between the periphery of elements 37 and a web 26. From viewing the changes in the position of the normal lines, it can be seen that the points of intersection between the normals to the roller surfaces 40–43 progressively follow the arcuate path 45 which begins at the center and progresses downwardly and to the right upon rotation of the secondary frame 15 from the solid through the dotted line positions illustrated in FIG. 4. In this regard, it should be noted that the numerals 50, 51, 52 and 53 illustrate the position of the extreme left hand edge of the second frame means during its path of travel. It is readily apparent that at no time is the distance of the lateral movement of the left side portion so great as to take it outside of the boundary of the base frame 16, as indicated by the line identified by numeral 55 which shows the upward extent of the lateral edge of base frame 16.

Numerals 50 through 53 also identify belt retaining means that act to limit lateral excursion of the belt so that the angle of the belt from horizontal during a change in direction is not so great as to permit unwanted discharge of material. The retaining means is secured to the outer end of one of the side portions, as seen in FIGS. 3 and 5, and comprises an idler roller 55 having a flared end 56.

While this invention has been shown and described with respect to a preferred embodiment, it will be understood by those skilled in the art that changes in form and details may be made without departing from the spirit and scope of the invention.

What is claimed, is:

1. An improved belt supporting and guiding apparatus for use in a conveyor system having a base frame and a continuous belt to move material in a horizontal plane along a non-linear path from a loading site to a discharge site, said supporting apparatus comprising:
   (a) a second frame mountable for rotation on the base frame and having a center portion and left and right side portions which extend upwardly and outwardly from the center portion, and wherein said second frame center portion and left and right side portions comprise (i) substantially linear main body parts having longitudinal and transverse dimensions; and (ii) a flange that extends outwardly from the main body part of each of the second frame portions in a direction substantially normal to the direct of the transverse dimension thereof;
   (b) rollers mounted for rotation within the second frame to receive the continuous belt; and
   (c) means movably connecting the base frame to the second frame at locations on the left and right side portions thereof so that variation in longitudinally directed belt tension will cause the second frame to rotate on the rollers about an instant center whose spatial location changes constantly during rotation of said second frame.

2. An apparatus as defined in claim 1 wherein each of said linear main body parts has two flanges that extend outwardly therefrom, said flanges defining means for operatively joining said second frame to said means movably connecting the base frame to said second frame.

3. An apparatus as defined in claim 1 wherein said means movably connecting said base frame to said second frame includes rotatable elements mounted in rolling engagement with said left and right second frame side portions.

4. An apparatus as defined in claim 3 wherein said rotatable elements have a circular periphery and are of greater diameter than width.

5. An apparatus as defined in claim 1 wherein said second frame includes:
   (a) pairs of said center portion and said left and right side portions; and
   (b) means fixedly joining said pairs into a single second frame base unit.

6. An apparatus as defined in claim 5 wherein said rollers in said second frame are mounted between said pairs of said center portion and said left and right portions.

7. An apparatus as defined in claim 1 wherein said means movably connecting the base frame to said second frame includes:
   (a) tabs attached to and extending outwardly from the base frame; and
   (b) rotatable elements mounted on said tabs at a location spaced from the base frame, said rotatable elements being in rolling contact with said left and right side portions.

8. An apparatus as defined in claim 1 wherein one of said side portions includes belt retaining means disposed on the end thereof opposite the end adjacent said center portion, wherein said belt retaining means acts to limit the lateral excursion of the belt.

9. An apparatus as defined in claim 8 wherein said belt retaining means is an idler roller having its axis of rotation extending in a direction substantially normal to the longitudinal dimension of the side portion on which it is disposed.

10. An apparatus as defined in claim 1 wherein said left and right side portions extend upwardly and outwardly from said center portion at an angle of 40°, with respect thereto.

11. An apparatus as defined in claim 1 or claim 10 wherein said second frame is movably connected to the base frame at locations that permit said second frame to rotate 20° in each direction from the position where said center portion is horizontal with respect to the base frame.

12. A conveyor system comprising:
   (a) a base frame;
   (b) a continuous belt to move material in a horizontal plane along a non-linear path from a loading site to a discharge site;
   (c) a second frame mountable for rotation on the base frame and having a center portion and left and right side portions which extend upwardly and outwardly from the center portion and wherein the center portion and left and right side portions comprise
      (1) substantially linear main body parts having longitudinal and transverse dimensions; and
      (2) a flange that extends outwardly from the main body part of each of the second frame portions in a direction substantially normal to the direction of the transverse dimension thereof;
   (d) rollers mounted for rotation within the second frame to receive the continuous belt; and
   (e) means movably connecting the base frame to the second frame at locations on the left and right portions thereof so that variation in longitudinally directed belt tension will cause the second frame to rotate on the rollers about an instant center whose spatial location changes constantly during rotation of the second frame.

* * * * *